United States Patent
Harada et al.

(10) Patent No.: US 10,611,676 B2
(45) Date of Patent: Apr. 7, 2020

(54) METHOD FOR PREPARING SYNTHETIC QUARTZ GLASS SUBSTRATE

(71) Applicant: Shin-Etsu Chemical Co., Ltd., Tokyo (JP)

(72) Inventors: Daijitsu Harada, Joetsu (JP); Kazuo Shirota, Joetsu (JP); Hisashi Yagi, Joetsu (JP); Masaki Takeuchi, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 14/736,618

(22) Filed: Jun. 11, 2015

(65) Prior Publication Data
US 2015/0360997 A1    Dec. 17, 2015

(30) Foreign Application Priority Data
Jun. 13, 2014    (JP) ................................ 2014-122280

(51) Int. Cl.
| | |
|---|---|
| *C03C 17/00* | (2006.01) |
| *C03C 19/00* | (2006.01) |
| *G01N 21/23* | (2006.01) |
| *B28D 1/00* | (2006.01) |
| *G01N 21/958* | (2006.01) |
| *B07C 5/342* | (2006.01) |

(52) U.S. Cl.
CPC ............... *C03C 17/00* (2013.01); *B28D 1/00* (2013.01); *C03C 19/00* (2013.01); *G01N 21/23* (2013.01); *B07C 5/342* (2013.01); *G01N 21/958* (2013.01)

(58) Field of Classification Search
CPC ........ C03C 17/00; C03C 19/00; G01N 21/23; G01N 21/958; B07C 5/342; B07C 5/344; B07C 5/3416; B28D 1/00
USPC ................................ 209/522, 576, 577, 588
See application file for complete search history.

(56) References Cited

U.S. PATENT DOCUMENTS

| | | | |
|---|---|---|---|
| 5,463,466 A | 10/1995 | David | |
| 6,143,676 A * | 11/2000 | Ohashi | ................ C03B 19/1453 501/54 |

(Continued)

FOREIGN PATENT DOCUMENTS

| | | |
|---|---|---|
| EP | 1557721 A2 | 7/2005 |
| EP | 2 399 708 A2 | 12/2011 |

(Continued)

OTHER PUBLICATIONS

European Search Report dated Nov. 4, 2015, issued in counterpart EP application No. 15171407.8 (9 pages).

(Continued)

*Primary Examiner* — Charles A Fox
*Assistant Examiner* — Kalyanavenkateshware Kumar
(74) *Attorney, Agent, or Firm* — Westerman, Hattori, Daniels & Adrian, LLP

(57) ABSTRACT

A synthetic quartz glass substrate is prepared by furnishing a synthetic quartz glass block, coating an arbitrary surface and an opposite surface of the block with a liquid having a transmittance of at least 99.0%/mm at the wavelength of birefringence measurement, measuring the birefringence of the block by letting light enter one coated surface and exit the other coated surface, and sorting the block to an acceptable or unacceptable group, based on the measured birefringence value.

19 Claims, 2 Drawing Sheets

(56) References Cited

U.S. PATENT DOCUMENTS

| | | | |
|---|---|---|---|
| 6,508,084 B1* | 1/2003 | Yokota | C03B 19/1453 |
| | | | 65/157 |
| 8,323,856 B2 | 12/2012 | Kikugawa et al. | |
| 2004/0021803 A1* | 2/2004 | Moersen | G01N 21/23 |
| | | | 349/19 |
| 2004/0237880 A1 | 12/2004 | Shigeru et al. | |
| 2007/0229795 A1 | 10/2007 | Zhang et al. | |
| 2008/0006056 A1 | 1/2008 | Hino | |
| 2010/0103420 A1 | 4/2010 | Ulrich et al. | |
| 2011/0318995 A1 | 12/2011 | Okafuji et al. | |

FOREIGN PATENT DOCUMENTS

| | | |
|---|---|---|
| JP | S63-154947 A | 6/1988 |
| JP | H08-075652 A | 3/1996 |
| JP | 2006-251781 A | 9/2006 |
| JP | 2006-273659 A | 10/2006 |
| JP | 2007-041312 A | 2/2007 |
| JP | 2010230465 A | 10/2010 |
| JP | 2011-26173 A | 2/2011 |
| JP | 2012-32786 A | 2/2012 |
| JP | 2013-140237 A | 7/2013 |
| JP | 2013-238849 A | 11/2013 |
| WO | 2006/085663 A1 | 8/2006 |
| WO | 2006/104179 A1 | 10/2006 |

OTHER PUBLICATIONS

Bridgette Budhlall, et al.; "High refractive index immersion fluids for 193 nm immersion lithography"; Proceedings of SPIE, vol. 5754, May 12, 2005, pp. 622-629, XP55223807 (8 pages).

Office Action dated Feb. 27, 2018, issued in Japanese Patent Application No. JP2015-112939.

Office Action dated Oct. 30, 2018, issued in counterpart Japanese application No. 2015-117442, with English translation. (9 pages).

* cited by examiner

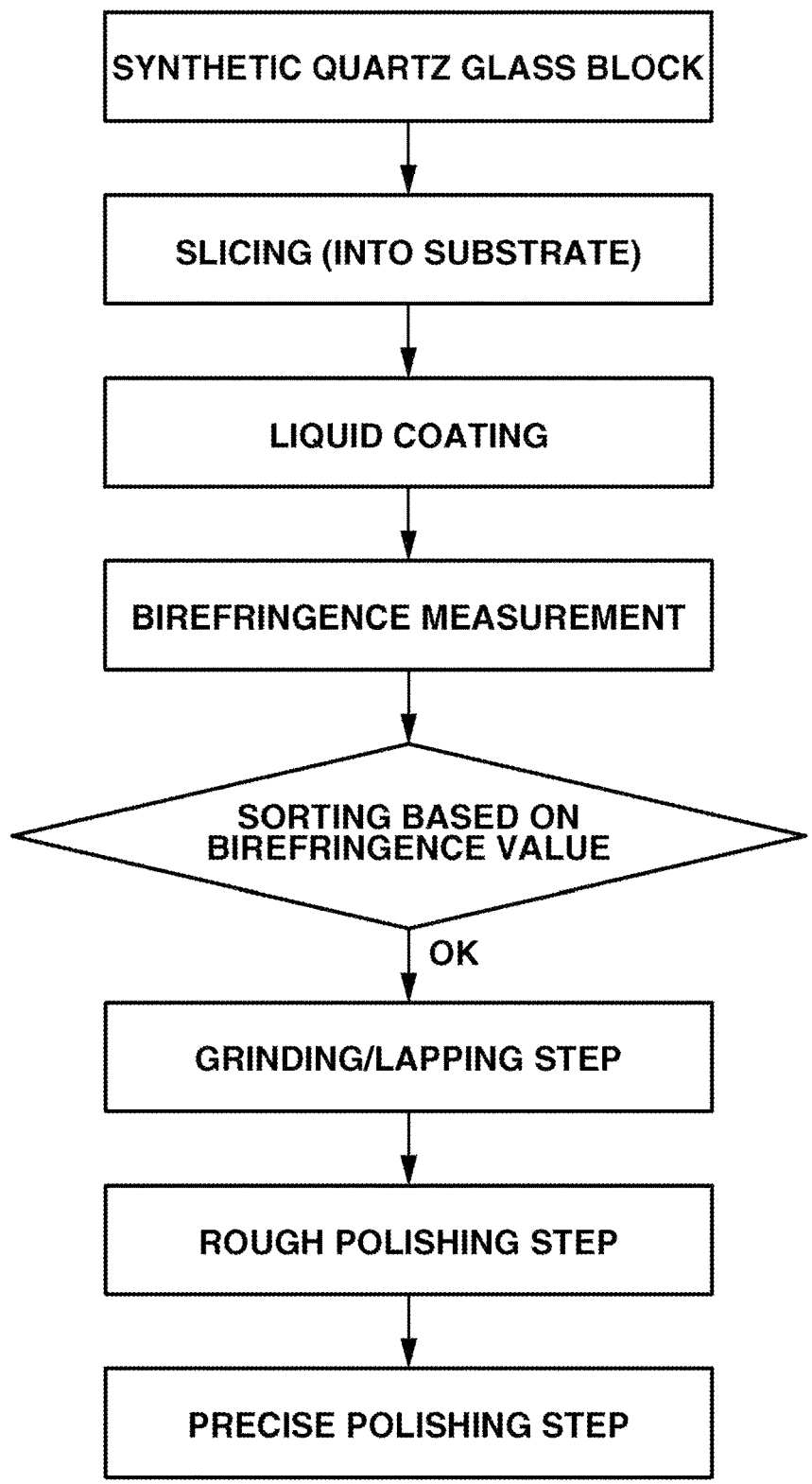

METHOD FOR PREPARING SYNTHETIC QUARTZ GLASS SUBSTRATE

CROSS-REFERENCE TO RELATED APPLICATION

This non-provisional application claims priority under 35 U.S.C. § 119(a) on Patent Application No. 2014-122280 filed in Japan on Jun. 13, 2014, the entire contents of which are hereby incorporated by reference.

TECHNICAL FIELD

This invention relates to a method for preparing synthetic quartz glass substrates which are useful as nanoimprint lithography mask substrates for use in the fabrication of advanced semiconductor-related electronic materials, photomask substrates for use in the fabrication of liquid crystal panel displays, and photomasks for excimer laser lithography, typically ArF excimer laser lithography, especially ArF immersion lithography.

BACKGROUND ART

Higher levels of integration in VLSI circuits have led to exposure patterns of increasingly small size. This has created a need for exposure light sources of shorter wavelength in the lithography systems or steppers used to write circuit patterns on semiconductor wafers. As a result, the mainstream light source in exposure tools has changed from the prior art KrF excimer laser (wavelength 248 nm) to ArF excimer laser (wavelength 193 nm). Recently the ArF immersion lithography is in practical application.

In the photolithography technology of the ArF immersion generation, it becomes the key to control the birefringence of photomask substrates. The photolithography technology adopts a system of transferring a photomask pattern to a resist film on a wafer by using ArF excimer laser as the light source, directing polarized illumination through a photomask substrate, and thus exposing the resist film patternwise. For transferring a pattern of finer feature size, it becomes important to improve the contrast. The contrast improvement is affected by such factors as flatness and birefringence of the photomask substrate. Birefringence manifests by residual strains or the like in quartz glass. If birefringence is significant, the polarization of light in the ArF immersion lithography tool is disturbed, leading to a decline of exposure performance.

For this reason, active research works are made how to control the birefringence of synthetic quartz glass substrates for photolithography. For example, Patent Document 1 discloses a mask blank for use in a semiconductor device fabrication technique employing an exposure light wavelength of 200 nm or shorter, comprising a synthetic quartz glass substrate and a light-shielding film laminated on the surface thereof, the mask blank having a birefringence value of 1 nm or less per substrate thickness at wavelength 193 nm. Patent Document 2 describes a process for producing a synthetic quartz glass having a birefringence value of 0.3 nm/cm or lower on the average at wavelength 633 nm. Patent Document 3 describes to heat treat synthetic quartz glass such that the major surface of a synthetic quartz glass block may have a maximum birefringence value of up to 2 nm/cm over its entirety.

Also, glass substrates used in the nanoimprint lithography (NIL) are required to have a high accuracy of shape or topography. The NIL is a technique of imprinting a nano-structured pattern to a resin for pattern transfer. The resolution of the pattern to be transferred depends on the resolution of nano-structures on the mold. Then the substrate on which a fine feature pattern is formed is required to have a high accuracy of shape. As mentioned above, birefringence manifests by residual strains or the like in quartz glass. If birefringence is significant, the substrate surface undergoes substantial changes of flatness and parallelism by the impact of residual stress, before and after processing synthetic quartz glass to a shape for NIL substrate. Such changes may lead to a focal shift during exposure and a pattern shift during transfer. To solve this problem, Patent Document 4 proposes a synthetic quartz glass substrate for microelectronic use having a maximum birefringence value of up to 3 nm/cm in its entirety.

Besides, the synthetic quartz glass members to be assembled in exposure tools and various other equipment used in the processes of manufacturing microelectronic and display components are also required to have a high purity and accuracy.

CITATION LIST

Patent Document 1: JP-A 2006-251781 (WO 2006/085663)
Patent Document 2: JP-A 2006-273659 (WO 2006/104179)
Patent Document 3: JP-A 2011-026173
Patent Document 4: JP-A 2012-032786 (US 20110318995, EP 2399708)

SUMMARY OF INVENTION

In all of Patent Documents 1 to 4, birefringence is measured after a synthetic quartz glass substrate is polished to a mirror-like surface. This is based on the belief that birefringence is not measureable unless a glass substrate surface is light transmissive.

As mentioned above, the specifications required for photomask-forming synthetic quartz glass substrates and NIL glass substrates include flatness and defectiveness as well as birefringence. Even if the step of polishing a synthetic quartz glass substrate is modified so as to meet the flatness and defect specifications, the substrate is regarded rejected unless its birefringence value finally falls in the desired range. Although cumbersome costly steps are taken until a highly flat, defect-free surface is reached, they run to waste, inviting a problem of low productivity.

An object of the invention is to provide a method for preparing synthetic quartz glass substrates having advantages including low birefringence, high flatness, and low defectiveness, in a highly productive and economical manner, the substrates being useful as reticles and photomasks for use in excimer laser lithography, typically ArF excimer laser lithography, especially ArF immersion lithography, and NIL molds.

The inventors have found that by coating a specific liquid to an arbitrary surface and an opposite surface of a synthetic quartz glass block, measuring the birefringence of the block by letting light enter one coated surface and exit the other coated surface, and sorting the block to an acceptable or unacceptable group, on the basis of the measured birefringence value, it becomes possible to sort glass blocks into acceptable and unacceptable groups in terms of one physical parameter, birefringence, at a relatively early stage of the synthetic quartz glass substrate manufacture process. Then synthetic quartz glass substrates can be prepared at a high productivity and low cost.

The method of the invention is as defined below.

[1] A method for preparing a synthetic quartz glass substrate, comprising the steps of:
furnishing a synthetic quartz glass block,
coating an arbitrary surface and an opposite surface (i.e., surface opposed to the arbitrary surface) of the block with a liquid, the liquid having a transmittance of at least 99.0%/mm at the wavelength of birefringence measurement,
measuring the birefringence of the block by letting light enter one coated surface and exit the other coated surface, and
sorting the block to an acceptable group or unacceptable group, based on the measured birefringence value.

[2] The method of [1] wherein in the sorting step, the block is sorted to the acceptable group when it has a maximum birefringence value of up to $1.5\alpha$ nm/cm in a range corresponding to an effective range of a synthetic quartz glass substrate which is sliced from the block, provided that the birefringence specification of synthetic quartz glass substrates is up to $\alpha$ nm/cm.

[3] The method of [1] wherein in the sorting step, the block is sorted to the acceptable group when it has a maximum birefringence value of up to 3 nm/cm in a range corresponding to an effective range of a synthetic quartz glass substrate which is sliced from the block.

[4] The method of [1] wherein in the sorting step, the block is sorted to the acceptable group when it has a maximum birefringence value of up to 2 nm/cm in a range corresponding to an effective range of a synthetic quartz glass substrate which is sliced from the block.

[5] The method of any one of [1] to [3] wherein after the block is sorted to the acceptable group in the sorting step, said method further comprises the steps of slicing the block into a synthetic quartz glass plate, grinding or lapping, rough polishing, and final precise polishing the glass plate.

[6] A method for preparing a synthetic quartz glass substrate, comprising the steps of:
furnishing a synthetic quartz glass block,
slicing the block into a synthetic quartz glass plate,
coating an arbitrary surface and an opposite surface of the plate with a liquid, the liquid having a transmittance of at least 99.0%/mm at the wavelength of birefringence measurement,
measuring the birefringence of the plate by letting light enter one coated surface and exit the other coated surface, and
sorting the plate to an acceptable group or unacceptable group, based on the measured birefringence value.

[7] The method of [6] wherein in the sorting step, the plate is sorted to the acceptable group when it has a maximum birefringence value of up to $1.5\alpha$ nm/cm in a range corresponding to an effective range of a synthetic quartz glass substrate, provided that the birefringence specification of synthetic quartz glass substrates is up to $\alpha$ nm/cm.

[8] The method of [6] wherein in the sorting step, the plate is sorted to the acceptable group when it has a maximum birefringence value of up to 2 nm/cm in a range corresponding to an effective range of a synthetic quartz glass substrate.

[9] The method of any one of [6] to [8] wherein after the synthetic quartz glass plate is sorted to the acceptable group in the sorting step, said method further comprises the steps of grinding or lapping, rough polishing, and final precise polishing the glass plate.

[10] The method of any one of [1] to [9] wherein the surface to be coated with the liquid has a roughness (Sa) of up to 1 mm.

[11] The method of any one of [1] to [10] wherein the difference between the refractive index of the liquid and the refractive index of the synthetic quartz glass substrate is within ±0.1.

[12] The method of any one of [1] to [11] wherein the liquid is selected from the group consisting of water, a monohydric alcohol, polyhydric alcohol, ether, aldehyde, ketone, carboxylic acid, hydrocarbon and an aqueous solution thereof.

[13] The method of any one of [1] to [12] wherein the liquid is a polyhydric alcohol having a molecular weight of at least 200.

[14] The method of any one of [1] to [13] wherein the liquid has a vapor pressure of lower than 2.3 kPa at 20° C.

Sometimes, the terms cutting or slicing, grinding or lapping, rough and precise polishing are collectively referred to as machining or processing.

Advantageous Effects of Invention

According to the invention, synthetic quartz glass substrates of appropriate grade for use as reticles and photomasks in excimer laser lithography, typically ArF excimer laser lithography, especially ArF immersion lithography, may be sorted out at a relatively early stage of the synthetic quartz glass substrate manufacture process, typically prior to the machining step. The method for preparing synthetic quartz glass substrates is highly productive and economical.

BRIEF DESCRIPTION OF DRAWINGS

FIG. 2 is a flow diagram showing steps of synthetic quartz glass substrate preparation in another embodiment of the invention.

DESCRIPTION OF PREFERRED EMBODIMENTS

Figure 1:
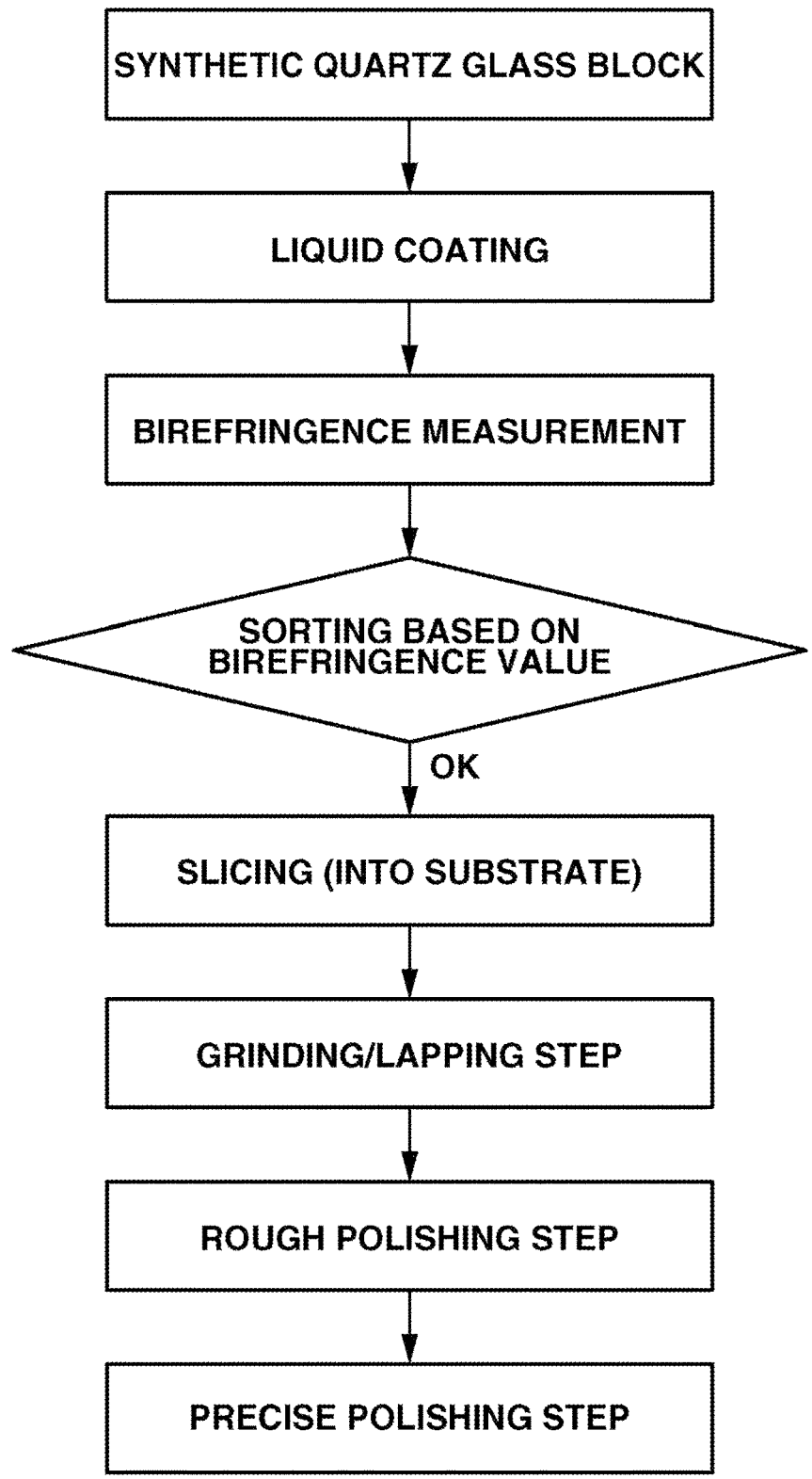
FIG. 1 is a flow diagram showing steps of synthetic quartz glass substrate preparation in one embodiment of the invention.

Referring to FIG. 1, the method for preparing synthetic quartz glass substrates according to the invention is described in detail. First, there is furnished a synthetic quartz glass block. It may be prepared by introducing a silica source compound such as a silane or siloxane compound into an oxyhydrogen flame, effecting vapor-phase hydrolysis or oxidative decomposition to form silica fine particles, depositing the particles on a target, thus forming a synthetic quartz glass ingot, placing the ingot in a high-purity carbon mold, holding the ingot in a vacuum melting furnace at a temperature of 1,700 to 1,900° C. for 30 to 120 minutes, for thereby hot shaping the ingot into a block of desired shape. The ingot forming process may be either the direct process of depositing silica fine particles on the target and concurrently melting/vitrifying or the indirect process of depositing silica fine particles on the target and then heating for vitrification. The synthetic quartz glass block may be of any shape such as tetragonal, rectangular or circular shape while it preferably has a diameter or longitudinal/transverse size of 150 to 250 mm and a thickness of 10 to 500 mm.

In one embodiment, a specific liquid is coated to two opposite surfaces of the synthetic quartz glass block.

In another embodiment, as shown in FIG. 2, the synthetic quartz glass block is cut (or sliced) into plates by a slicing means or wire saw before the step of coating a specific liquid. As compared with the measurement of birefringence at the block stage, the measurement of birefringence of a glass plate provides for an accurate anticipation of the birefringence of a final product following lapping and mirror finishing. In this case, the thickness of the glass plate depends on the thickness specification of the final product following lapping and mirror finishing. Preferably, the thickness of the glass plate is greater than the thickness of the final product by 10 µm to 1 mm, more preferably 50 µm to 500 µm. If the plate is too thick, an error from the birefringence of the final product may become noticeable, a greater machining allowance must be taken until processing to the final product, cumbersome work may be necessary, and a fraction of the material corresponding to the machining allowance may be wasted. If the plate is too thin, residual strains by cutting and lapping may be kept in the final product, which is rejected because of defects.

The method of the invention is advantageously applicable to the process of working and preparing 6-inch substrates [(152 mm±0.2 mm)×(152 mm±0.2 mm)×(6.35 mm±0.1 mm)] or 9-inch substrates [(228 mm±0.2 mm)×(228 mm±0.2 mm)×(6.35 mm±0.1 mm)]. As the substrate material, silica glass or quartz glass is preferred.

The liquid is coated to two surfaces of the synthetic quartz glass block or synthetic quartz glass plate, preferably rough surfaces which become light transmissive when coated with the liquid. The surface to be coated with the liquid preferably has a surface roughness (Sa) of up to 1 mm, more preferably 0.01 µm<Sa≤1 mm, even more preferably 0.1 µm<Sa≤100 µm, most preferably 0.5 µm<Sa≤50 µm. A surface with Sa of less than 0.01 µm is nearly mirror-like and light transmissive as such, i.e., without liquid coating, indicating that the step of coating liquid so as to be light transmissive is meaningless. If surface roughness Sa is more than 1 mm, surface irregularities are not fully buried even by coating of liquid, and then accurate birefringence measurement may be inhibited by diffuse reflection of light at the incident and emergent surfaces.

The roughness of the surface to be coated with the liquid may be measured by means of a contact type instrument such as an atomic force microscope (AFM) or probe type roughness meter, or a non-contact type instrument such as a laser interferometer or white light interferometer. The range of measurement, in the case of measurement over two-dimensional plane, is preferably from 1 µm squares to 1 mm squares, more preferably from 10 µm squares to 100 µm squares, and in the case of measurement along one-dimensional length, is preferably from 10 µm to 10 mm, more preferably from 100 µm to 1 mm. If the measurement range is too narrow, an accurate roughness may not be determined. If the measurement range is too broad, measurement may be time consuming or become measurement of waviness or flatness, which is inadequate as the reference by which it is judged whether or not light transmission is increased by liquid coating.

The liquid coated to two opposite surfaces, an arbitrary surface and a surface opposed thereto of the synthetic quartz glass block or plate should have a transmittance of at least 99.0%/mm, preferably at least 99.5%/mm, and more preferably at least 99.9%/mm at the wavelength of light used in measurement of birefringence. If the liquid has a transmittance of less than 99.0%/mm, which means that the liquid contains dyes or foreign matter as impurities, or if the liquid itself is absorptive, the birefringence of a synthetic quartz glass block or plate cannot be accurately measured because the quantity of light reaching the light-receiving sensor is reduced by scattering, or because the polarized state is disturbed upon passage through the liquid.

It is preferred from the standpoint of acquisition of an accurate birefringence value that the difference between the refractive index of the liquid and the refractive index of the synthetic quartz glass substrate be in a range of ±0.1 (−0.1 to +0.1), more preferably ±0.05 (−0.05 to +0.05).

The liquid to be coated may be selected from among water; monohydric alcohols of 1 to 12 carbon atoms; polyhydric alcohols such as ethylene glycol, diethylene glycol, triethylene glycol, propylene glycol, 1,3-butylene glycol, tetramethylene glycol, glycerol, polyethylene glycol, and phenol; ethers such as dimethyl ether, methyl ethyl ether, diethyl ether, tetrahydrofuran, 2,5-dimethylfuran, benzofuran, and dibenzofuran; aldehydes such as acetaldehyde, propionaldehyde and benzaldehyde; ketones such as acetone, methyl ethyl ketone, diethyl ketone and cyclohexanone; carboxylic acids of 1 to 8 carbon atoms such as saturated fatty acids, oleic acid, linoleic acid and linolenic acid; hydrocarbons of 5 to 17 carbon atoms such as linear alkanes; and aqueous solutions thereof. Since these liquids are relatively easy to handle and commercially available as reagents of guaranteed grade or purity, they are expected to be of consistent quality. Coating such liquid does not substantially affect birefringent properties of quartz glass, or if affects, the influence which is always constant can be previously taken into account. Of these, polyhydric alcohols having a molecular weight of at least 100, especially polyhydric alcohols having a molecular weight, specifically weight average molecular weight (Mw) of 200 to 2,000 as measured versus polystyrene standards by gel permeation chromatography (GPC) are preferred because they have an appropriate viscosity to coat to a rough glass surface and are readily washed away with water (i.e., ease of removal). Since polyhydric alcohols having a high molecular weight, typically polymers, tend to have a high viscosity, they, when coated onto a surface, are likely to remain on the surface. For instance, even when the surface where light is incident or emergent is placed downside, the surface maintains the coated state so that the birefringence of a quartz glass block or plate may be consistently measured.

The liquid preferably has a vapor pressure of lower than 2.3 kPa, more preferably lower than 1.4 kPa, at 20° C. for the purpose of preventing the coated surface of the synthetic quartz glass block or plate from drying. If the glass surface becomes dry, light is not transmitted by the glass and an accurate birefringence value is not measurable.

When the liquid is coated to two opposite surfaces, an arbitrary surface and an opposite surface of the synthetic quartz glass block or plate, any suitable means such as brush coating, spray coating, and spin coating may be used. Preferably from the standpoint of preventing the liquid from drying out so that an accurate birefringence value is not measurable, the coating step is conducted as quickly as possible and immediately followed by the step of measuring birefringence.

Next, the synthetic quartz glass block or plate having the two opposite surfaces coated with the liquid is measured for birefringence by letting light enter one coated surface and exit the other coated surface. The birefringence measurement may be performed by any suitable method. Since a high accuracy of measurement is desirable, the preferred systems are, for example, a birefringence measuring system ABR-10A (UNIOPT Co., Ltd.) composed of a common optical path interferometer of optical heterodyne method and a data processing/XY scan stage of Fourier analysis; Exicor series (HINDS Instruments) using photoelastic modulation in the optical system and including a plurality of lineups of 157 nm, 193 nm, and 633 nm as the light source; and birefringence evaluation system PA-100 (Photonic Lattice, Inc.) comprising a light source section having a LED lamp combined with a circularly polarizing filter and a light receiving section having a polarizing filter integrated assembly combined with a CCD camera.

Specifically, on use of a measuring instrument using a laser light source like ABR-10A and Exicor, a laser spot has a small diameter of less than 1 mm, and a cross-sectional portion within the confine of the laser spot and in the optical path of laser beam in the glass may be determined for birefringence and major axis azimuth on every measurement. When a birefringence value in an arbitrary range in glass is determined by such measuring instrument, for example, arbitrary measurement pitches are set in an arbitrary range (e.g., range of 140 mm×140 mm) on glass surface and inclusive of the end of the range, in both X and Y directions (e.g., X direction pitch 10 mm, Y direction pitch 10 mm) to determine points of measurement, and for each of data points of measurement (e.g., 225 points), birefringence value and major axis orientation are determined. From these data, data including maximum, minimum, average, and distribution of birefringence values and distribution of major axis orientation in an arbitrary range in the glass are acquirable.

On the other hand, on use of a measuring instrument of measuring birefringence values all at once in the LED illuminating area using a polarizing filter integrated assembly in the light receiving section, like PA-100, depending on the distance between the CCD camera and the synthetic quartz glass block and the resolution of the integrated assembly, measurement is made on the glass in the LED illuminating area. The glass surface is divided into arbitrary rectangular ranges (e.g., longitudinal/transverse 0.1 to 10 mm ranges) continuous in both X and Y directions, and the birefringence value and major axis orientation of each finely divided area are determined. That is, the birefringence value and major axis orientation in each area or cross section of the glass through which light passes may be determined. Among these, an arbitrary range to be evaluated is set, and each of the finely divided areas within that range is evaluated for birefringence value and major axis orientation. Thus, data including maximum, minimum, average, and distribution of birefringence values and distribution of major axis orientation in the glass are acquirable.

This is followed by the step of sorting the block or plate to an acceptable or unacceptable group. Based on either one or both of the birefringence value and major axis orientation obtained from the birefringence measurement by the above method, judgment is made from the maximum of birefringence value in a range corresponding to an effective range of a synthetic quartz glass substrate sliced from a synthetic quartz glass block. That is, for both a synthetic quartz glass block and a synthetic quartz glass plate, in the sorting step, preferably a block or plate is judged acceptable, provided that the birefringence specification of the synthetic quartz glass substrate is equal to or less than $\alpha$ nm/cm, when it has a maximum birefringence value of equal to or less than $1.5\alpha$ nm/cm, more preferably equal to or less than $1.25\alpha$ nm/cm, and even more preferably equal to or less than $1.1\alpha$ nm/cm, in a range corresponding to an effective range of a synthetic quartz glass substrate sliced from a synthetic quartz glass block.

Specifically, a synthetic quartz glass block is preferably judged acceptable when it has a maximum birefringence value of equal to or less than 3 nm/cm, more preferably equal to or less than 2 nm/cm, in a range corresponding to an effective range of a synthetic quartz glass substrate sliced from the block. On the other hand, a synthetic quartz glass plate is preferably judged acceptable when it has a maximum birefringence value of equal to or less than 2 nm/cm in a range corresponding to an effective range of a synthetic quartz glass substrate.

It is noted that although synthetic quartz glass substrates having a maximum birefringence value of up to 2 nm/cm are required as the specifications of synthetic quartz glass substrates for photomasks of the ArF immersion lithography generation, a certain error occurs between the value of measurement of a synthetic quartz glass block and the value of measurement of a synthetic quartz glass substrate which is sliced from the block and machined to a mirror-like surface. Thus if the threshold of birefringence value measured on the block or rough-surface plates is set too small, even those plates which fall in a birefringence value of 2 nm/cm upon measurement of a synthetic quartz glass substrate which has been machined to a mirror-like surface are judged unacceptable, indicating a possibility that blocks having low birefringence become wasted. On the other hand, if the threshold is set higher than 3 nm/cm, those out-of-specification plates which exceed the birefringence value of 2 nm/cm upon measurement of a synthetic quartz glass substrate which has been machined to a mirror-like surface become more. Often an extra step of machining for flatness and defect-free is applied to such out-of-specification substrates, with productivity being worsened.

With respect to the dimensions of synthetic quartz glass substrates on current widespread use, the mainstream is 6-inch substrates [(152 mm±0.2 mm)×(152 mm±0.2 mm)×(6.35 mm±0.1 mm)]. At the stage of a synthetic quartz glass block as the stock material therefor, the block is prepared to outer dimensions of greater than 152 mm×152 mm. Since the photomask-forming glass substrate is required to have accurate outer dimensions, it is recommended that the block is prepared relatively larger to gain a machining allowance and a substrate of 152 mm×152 mm is fabricated from a range inside the outer dimensions of the block, because of the tendency of substrates having a better birefringence value. While a synthetic quartz glass block is generally prepared through a heat treatment step, there is a tendency that, of a central portion and an outer edge-adjacent portion of the block, the outer edge-adjacent portion has a relatively high birefringence value due to the impact of temperature difference during the heat treatment. In the case of a synthetic quartz glass block of 160 mm×160 mm, for example, once birefringence values are measured over the entire 160 mm×160 mm surface, the birefringence values in a range corresponding to the effective range set within a synthetic quartz glass plate of 152 mm×152 mm cut out of the surface are picked up, and the synthetic quartz glass block is sorted to the acceptable group when the maximum of these birefringence values is within 2 nm/cm.

It has been described that on measurement of synthetic quartz glass blocks, they are sorted based on the maximum birefringence value within 3 nm/cm, whereas a synthetic quartz glass substrate which has been machined to a mirror-like surface is judged acceptable or unacceptable using the birefringence value of 2 nm/cm as the threshold. A difference is introduced between the thresholds by taking an error into account because it is difficult to accurately anticipate the birefringence value of a plate-form synthetic quartz glass substrate from the birefringence value of a synthetic quartz glass block. Since the block is thick as compared with the plate-form substrate, if the birefringence value varies in thickness direction, the measured birefringence value of the block is substantially the average of values in thickness direction. That is, a variation in birefringence value may occur among plate-form synthetic quartz glass substrates. At the stage of blocks, the birefringence value of a block in a range assumed to be commensurate with the effective range of a substrate is evaluated, from which the birefringence value of a substrate is anticipated. Since it is difficult to assume a range commensurate with the effective range, an error of several millimeters is often introduced. There are further undesirable factors, for example, coating of the liquid is uneven, and a slight error is introduced even when the liquid is selected so that the difference in refractive index between the liquid and the quartz glass is within ±0.1. Because of these factors, it is difficult to accurately anticipate the birefringence value of a plate-form glass substrate from the measured birefringence value of a glass block.

For the above reason, if the stock material is precious or if its cost is relatively high, preferably the threshold for sorting blocks is set somewhat higher than the threshold for judging whether the synthetic quartz glass substrate which has been polished to a mirror-like surface is acceptable or unacceptable. On the other hand, if the stock material is relatively easy to prepare or if its cost is relatively low and the cost of machining steps is relatively high (for example, specifications regarding flatness and defectiveness are high), the flow chart may be designed such that the birefringence threshold for sorting blocks is set severer than the threshold for judging whether the birefringence value of synthetic quartz glass substrate is acceptable or unacceptable, for thereby increasing the acceptable ratio for selecting the finally-obtainable synthetic quartz glass substrates on birefringence value and minimizing the cost of machining steps.

According to the invention, synthetic quartz glass blocks or plates are sorted in terms of birefringence value at the relatively early stage of the process of machining and preparing synthetic quartz glass substrates. Then several advantages are expectable in the manufacture of synthetic quartz glass substrates for forming reticles and photomasks subject to ArF excimer laser lithography, and especially ArF immersion lithography.

For synthetic quartz glass substrates suited for a particular grade of photomask-forming synthetic quartz glass substrates, that is, photomask-forming synthetic quartz glass substrates subject to severe specifications requiring physical properties of high level, for example, when (1) substrates having a birefringence value of 2 nm/cm, a flatness of 0.3 μm, and required to have a surface free of defects or foreign particles in excess of 0.1 μm, and (2) substrates having an arbitrary birefringence value, a flatness of 0.8 μm, and required to have a surface free of defects or foreign particles in excess of 1.0 μm are prepared in a separate manner, sorting in terms of birefringence value is carried out at the stage of stock material which is processed via later steps including grinding or lapping step, rough polishing step, and final precision polishing step into a precisely mirror-finished glass substrate, that is, at the stage of a synthetic quartz glass block or a synthetic quartz glass substrates sliced from a synthetic quartz glass block. Then, only those stock materials which are anticipated to fall in the specification: birefringence value of 2 nm/cm are processed so as to meet flatness and defectiveness specifications whereas excessive processing of those stock materials which are anticipated not to fall in the specification is avoidable. As a result, photomask-forming synthetic quartz glass substrates can be prepared in a highly productive and economic manner.

If the stock material is precious or if its cost is relatively high, it is preferred for minimizing the wasting of the stock material that the threshold for sorting synthetic quartz glass blocks to an acceptable or unacceptable group is set somewhat higher than the threshold for judging whether the synthetic quartz glass substrate which has been polished to a mirror-like surface is acceptable or unacceptable. On the other hand, if the stock material is relatively easy to prepare or if its cost is relatively low and the cost of machining steps is relatively high (for example, specifications regarding flatness and defectiveness are high), the flow chart may be designed such that the threshold for sorting synthetic quartz glass blocks is set severer than the threshold for judging whether the synthetic quartz glass substrate which has been polished to a mirror-like surface is acceptable or unacceptable, for thereby increasing the yield of final birefringence value and minimizing the cost of machining steps.

After the sorting step, in the case of a synthetic quartz glass block, which is judged acceptable, the liquid which has been coated to the block for measurement of birefringence is removed, the block is cut or sliced into plates, and the resulting synthetic quartz glass plates are subjected to grinding or lapping, rough polishing and precise polishing steps, yielding synthetic quartz glass substrates. These polishing steps may be carried out by standard techniques used in the prior art. Finally, there are produced synthetic quartz glass substrates typically having a surface roughness Sa of 0.05 to 1 nm and a birefringence value of up to 2 nm/cm.

On the other hand, when the birefringence specification required for product substrates is moderate and the threshold is very high, for example, when the threshold for sorting blocks is set low with a tolerance so that substantially all substrates are judged acceptable (while an error between the measurement of a synthetic quartz glass block and the measurement of a substrate due to variations among substrates is taken into account) and satisfactory yields are still obtained, or when the birefringence specification required for the product substrates is up to 20 nm/cm and the threshold for sorting blocks is set to 10 nm/cm, it may be contemplated to judge blocks to be acceptable or not based on the measurement values of blocks rather than the cumbersome step of measuring all substrates. This process is economical due to the reduced number of measurements.

After the sorting step, in the case of a synthetic quartz glass plate, which is judged acceptable, the liquid which has been coated to the plate for measurement of birefringence is removed, the synthetic quartz glass plates are subjected to grinding or lapping, rough polishing and precise polishing steps, yielding synthetic quartz glass substrates. These polishing steps may be carried out by standard techniques used in the prior art. Finally, there are produced synthetic quartz glass substrates typically having a surface roughness Sa of 0.05 to 1 nm and a birefringence value of up to 2 nm/cm.

EXAMPLE

Examples are given below by way of illustration and not by way of limitation.

Example 1

As the stock material, there were furnished five synthetic quartz glass blocks (a, b, c, d and e) in the form of a quadrangular prism of 160 mm long by 160 mm wide by 100 mm high and having a surface roughness (Sa) of 1.5 µm. Two opposite (160 mm×160 mm) surfaces of the block were evenly brush coated with polyethylene glycol (Polyethylene Glycol 400 by Wako Pure Chemical Industries, Ltd.) so that light might enter one coated surface and exit the other coated surface. Using birefringence evaluation system PA-100 (Photonic Lattice, Inc.), a birefringence value was measured on the (160 mm×160 mm) surface at the wavelength of 543 nm. It took about 5 minutes from the start of coating of polyethylene glycol to the completion of birefringence measurement.

After the completion of measurement, the maximum of birefringence values in the (152 mm×152 mm) range of each of five synthetic quartz glass blocks was computed, with the results shown below.

| | |
|---|---|
| a | 3.2 nm/cm |
| b | 4.0 nm/cm |
| c | 2.0 nm/cm |
| d | 2.5 nm/cm |
| e | 2.8 nm/cm |

Of the blocks, those blocks "c", "d" and "e" having a maximum birefringence value of up to 3 nm/cm were sorted to the group for the manufacture of Grade P substrates requiring relatively precise processing to the specifications: birefringence value 2 nm/cm, flatness 0.3 µm, and 0.1 mm defect-free; and those blocks "a" and "b" having a maximum birefringence value in excess of 3 nm/cm were sorted to the group for the manufacture of Grade Q substrates requiring relatively simple processing to the specifications: arbitrary birefringence value, flatness 0.8 µm, and 1.0 mm defect-free.

Each block was cut into plates for 6-inch substrates [(152 mm±0.2 mm)×(152 mm±0.2 mm)×(6.35 mm±0.1 mm)].

The plate was subjected to lapping step, rough polishing step on a double-side polishing machine using a hard urethane polishing pad and cerium oxide abrasive slurry, and final precision polishing on a double-side polishing machine using a suede polishing pad and colloidal silica abrasive slurry. There was obtained a synthetic quartz glass substrate having a precision mirror-like surface which was suited for photomask.

Each of the synthetic quartz glass substrates thus obtained was measured for birefringence value. For the purpose of product manufacture, it sufficed to measure the birefringence of only those substrates fabricated from the glass blocks "c", "d" and "e" meeting the birefringence specification. At this time, for the purpose of collecting data, birefringence measurement was performed on all the substrates fabricated from five glass blocks "a", "b", "c", "d" and "e". Of the substrates fabricated from five glass blocks, a proportion of samples meeting a maximum birefringence value of up to 2 nm/cm was as follows.

| | |
|---|---|
| a | 20% |
| b | 0% |
| c | 100% |
| d | 80% |
| e | 60% |

As seen from these results, since only the blocks "c", "d" and "e" were sorted to the group for the manufacture of Grade P substrates requiring the specification: birefringence value 2 nm/cm, products were obtained in an average birefringence yield (an average value of the sorting due to birefringence specification) of 80%. If all synthetic quartz glass blocks "a", "b", "c", "d" and "e" were used for the manufacture of Grade P products while omitting the step of sorting at the block stage, synthetic quartz glass substrates were manufactured from the glass blocks "a" and "b" in an average birefringence yield of 10%, indicating that precise processing on these substrates was wasteful.

Example 2

As the stock material, there were furnished three synthetic quartz glass blocks (f, g and h) in the form of a quadrangular prism of 160 mm long by 160 mm wide by 100 mm high and having a surface roughness (Sa) of 1.5 µm. The blocks were sliced into 42 synthetic quartz glass plates of approximate outer dimensions of 152 mm×152 mm×6.90 mm having rough surfaces. Two opposite (152 mm×152 mm) surfaces of each substrate were evenly brush coated with polyethylene glycol (Polyethylene Glycol 400 by Wako Pure Chemical Industries, Ltd., average molecular weight 360-440). Using birefringence evaluation system PA-100 (Photonic Lattice, Inc.), a birefringence value was measured at the wavelength of 543 nm, from which the maximum value of birefringence over the range of 152 mm×152 mm was computed. There were 31 plates having a birefringence value within 3 nm/cm and 11 plates having a birefringence value in excess of 3 nm/cm.

From all the plates, 31 rough surface plates having a birefringence value within 3 nm/cm were sorted to the group for the manufacture of Grade P substrates requiring the specification: birefringence value 2 nm/cm, whereas 11 rough surface plates having a birefringence value in excess of 3 nm/cm were sorted to the group for the manufacture of Grade Q substrates not requiring birefringence specification.

By the same processing procedure as in Example 1, synthetic quartz glass substrates having a precision mirror-like surface were obtained which were suited for photomask. Each of the substrates was measured for birefringence. For the purpose of product manufacture, it sufficed to measure the birefringence of only those substrates sorted to Grade P meeting the birefringence specification. At this time, for the purpose of collecting data, birefringence measurement was performed on all the substrates including 11 substrates sorted to Grade Q. Of 31 substrates of Grade P and 11 substrates of Grade Q, a proportion of samples meeting a maximum birefringence value of up to 2 nm/cm was as follows.

| | | |
|---|---|---|
| Grade P | 26 of 31 substrates | 84% |
| Grade Q | 0 of 11 substrates | 0% |

As seen from these results, since sorting was carried out at the stage of rough surface synthetic quartz glass plates prior to precise processing, products were manufactured from the substrates of Grade P in a birefringence yield of 84%. If all the plates were used for the manufacture of Grade P while omitting the step of sorting at the plate state, precise processing on 11 substrates was wasteful.

Example 3

There were furnished five synthetic quartz glass blocks (i, j, k, l and m), which were measured for birefringence value as in Example 1 aside from using ethanol (Wako Pure Chemical Industries, Ltd.) instead of polyethylene glycol.

The maximum of birefringence values in the (152 mm×152 mm) range was computed, with the results shown below.

| | |
|---|---|
| i | 4.5 nm/cm |
| j | 4.2 nm/cm |
| k | 2.8 nm/cm |
| l | 3.4 nm/cm |
| m | 2.8 nm/cm |

Of the blocks, those blocks "k" and "m" having a maximum birefringence value of up to 3 nm/cm were sorted to the group for the manufacture of Grade P requiring the specification: birefringence value 2 nm/cm; and those blocks "i", "j" and "l" having a maximum birefringence value in excess of 3 nm/cm were sorted to the group for the manufacture of Grade Q not requiring birefringence specification.

By the same process as in Example 1, synthetic quartz glass substrates for photomask were manufactured. Each of the substrates was measured for birefringence.

For the purpose of product manufacture, it sufficed to measure the birefringence of only those substrates fabricated from the glass blocks "k" and "m" meeting the birefringence specification. At this time, for the purpose of collecting data, birefringence measurement was performed on all the substrates fabricated from five glass blocks "i", "j", "k", "l" and "m". Of the substrates fabricated from five glass blocks, a proportion of samples meeting a maximum birefringence value of up to 2 nm/cm was as follows.

| | |
|---|---|
| i | 10% |
| j | 0% |
| k | 70% |
| l | 60% |
| m | 90% |

As seen from these results, since only the blocks "k" and "m" were sorted to the group for the manufacture of Grade P requiring the specification: birefringence value 2 nm/cm, products were obtained in an average birefringence yield of 80%. Since the blocks "i" and "j" had a low birefringence value and were sorted out at the block stage, wasteful precise processing on them was avoided. Although the block "l" had a birefringence value beyond the threshold, substrates manufactured therefrom had a relatively satisfactory birefringence value, indicating that this block was over-specification stock as Grade Q. The reason is that since ethanol dried up locally on the block during measurement of birefringence, the coated block locally failed to ensure that light enters one coated surface and exits the other coated surface, failing to measure accurate values.

Example 4

As in Example 1, there were furnished five synthetic quartz glass blocks (n, o, r, s and t), which were measured for birefringence. The maximum of birefringence values in the 152 mm×152 mm range was computed, with the results shown below.

| | |
|---|---|
| n | 2.1 nm/cm |
| o | 1.8 nm/cm |
| r | 1.9 nm/cm |
| s | 3.3 nm/cm |
| t | 3.7 nm/cm |

Of the blocks, those blocks "o" and "r" having a maximum birefringence value of up to 2 nm/cm were sorted to the group for the manufacture of Grade P requiring the specification: birefringence value 2 nm/cm; and those blocks "n", "s" and "t" having a maximum birefringence value in excess of 2 nm/cm were sorted to the group for the manufacture of Grade Q not requiring birefringence specification.

By the same process as in Example 1, synthetic quartz glass substrates for photomask were manufactured. Each of the substrates was measured for birefringence. At this time, for the purpose of collecting data, birefringence measurement was performed on all the substrates fabricated from five glass blocks "n", "o", "r", "s" and "t". Of the substrates fabricated from five glass blocks, a proportion of samples meeting a maximum birefringence value of up to 2 nm/cm was as follows.

| | |
|---|---|
| n | 80% |
| o | 100% |
| r | 95% |
| s | 40% |
| t | 30% |

As seen from these results, since only the blocks "o" and "r" were sorted to the group for the manufacture of Grade P requiring the specification: birefringence value 2 nm/cm, products were obtained in an average birefringence yield as high as 97.5%.

Example 5

In the manufacture of Grade Z synthetic quartz glass substrates requiring the specification: birefringence value of up to 20 nm/cm, the threshold value of birefringence value for sorting and guaranteeing synthetic quartz glass blocks was determined. It was confirmed that with various errors including variations between substrates taken into account, if a block has a birefringence value of up to 15 nm/cm, substantially all substrates fabricated from the block meet the specification: up to 20 nm/cm. Based on this block sorting threshold, this Example attempted to manufacture synthetic quartz glass substrates.

As in Example 1, there were furnished twenty synthetic quartz glass blocks, which were measured for birefringence. The maximum of birefringence values in the (152 mm×152 mm) range was computed to be 12.4 nm.

Since the birefringence value of 12.4 nm at the maximum indicated that all the blocks met the block sorting threshold of 15 nm/cm, all of twenty synthetic quartz glass blocks were sorted to the group for the manufacture of Grade Z.

Essentially, the sorting threshold is set at the stage of blocks as guarantee therefor in order to eliminate the cumbersome step of measuring the birefringence of substrates one by one. At this time, for the purpose of collecting data, birefringence measurement was performed on all the synthetic quartz glass substrates fabricated from twenty glass blocks. Of 400 substrates fabricated from 20 synthetic quartz glass blocks, even those having the maximum birefringence value had a value of 15.6 nm/cm. It was confirmed that all substrates fell in the specification: 20 nm/cm.

Japanese Patent Application No. 2014-122280 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for preparing a synthetic quartz glass substrate for a nanoimprint lithography mask substrate or a photomask substrate, comprising the steps of:
   furnishing a synthetic quartz glass block having a tetragonal shape,
   coating two surfaces consisting of an arbitrary surface and an opposite surface of the block with a liquid, the two surfaces being rough surfaces which become light transmissive when coated with the liquid, the liquid having a transmittance of at least 99.0%/mm at the wavelength of birefringence measurement,
   measuring the birefringence of the block by letting light enter one coated surface and exit the other coated surface, and
   sorting the block to an acceptable group or unacceptable group, based on the measured birefringence value,
   wherein the block is sorted to the acceptable group when it has a maximum birefringence value of up to 3 nm/cm in a range corresponding to an effective range of a synthetic quartz glass substrate which is sliced from the block.

2. The method of claim 1 wherein in the sorting step, the block is sorted to the acceptable group when it has a maximum birefringence value of up to $1.5\alpha$ nm/cm in a range corresponding to an effective range of a synthetic quartz glass substrate which is sliced from the block, provided that the birefringence specification of synthetic quartz glass substrates is up to $\alpha$ nm/cm.

3. The method of claim 1 wherein in the sorting step, the block is sorted to the acceptable group when it has a maximum birefringence value of up to 2 nm/cm in a range corresponding to an effective range of a synthetic quartz glass substrate which is sliced from the block.

4. The method of claim 1 wherein after the block is sorted to the acceptable group in the sorting step, said method further comprises the steps of slicing the block into a synthetic quartz glass plate, grinding or lapping, rough polishing, and final precise polishing the glass plate.

5. The method of claim 1 wherein the surface to be coated with the liquid has a roughness (Sa) of up to 1 mm.

6. The method of claim 1 wherein the difference between the refractive index of the liquid and the refractive index of the synthetic quartz glass substrate is within ±1.

7. The method of claim 1 wherein the liquid is selected from the group consisting of water, a monohydric alcohol, polyhydric alcohol, ether, aldehyde, ketone, carboxylic acid, hydrocarbon and an aqueous solution thereof.

8. The method of claim 1 wherein the liquid is a polyhydric alcohol having a molecular weight of at least 200.

9. The method of claim 1 wherein the liquid has a vapor pressure of lower than 2.3 kPa at 20° C.

10. A method of claim 1 wherein the liquid is coated by brush coating, spray coating, or spin coating.

11. A method for preparing a synthetic quartz glass substrate for a nanoimprint lithography mask substrate or a photomask substrate, comprising the steps of:
    furnishing a synthetic quartz glass block,
    slicing the block into a synthetic quartz glass plate having a tetragonal shape,
    coating two surfaces consisting of an arbitrary surface and an opposite surface of the plate with a liquid, the two surfaces being rough surfaces which become light transmissive when coated with the liquid, the liquid having a transmittance of at least 99.0%/mm at the wavelength of birefringence measurement,
    measuring the birefringence of the plate by letting light enter one coated surface and exit the other coated surface, and
    sorting the plate to an acceptable group or unacceptable group, based on the measured birefringence value
    wherein the plate is sorted to the acceptable group when it has a maximum birefringence value of up to 2 nm/cm in a range corresponding to an effective range of a synthetic quartz glass substrate which is sliced from the plate.

12. The method of claim 11 wherein in the sorting step, the plate is sorted to the acceptable group when it has a maximum birefringence value of up to $1.5\alpha$ nm/cm in a range corresponding to an effective range of a synthetic quartz glass substrate, provided that the birefringence specification of synthetic quartz glass substrates is up to $\alpha$ nm/cm.

13. The method of claim 11 wherein after the synthetic quartz glass plate is sorted to the acceptable group in the sorting step, said method further comprises the steps of grinding or lapping, rough polishing, and final precise polishing the glass plate.

14. The method of claim 11 wherein the surface to be coated with the liquid has a roughness (Sa) of up to 1 mm.

15. The method of claim 11 wherein the difference between the refractive index of the liquid and the refractive index of the synthetic quartz glass substrate is within ±0.1.

16. The method of claim 11 wherein the liquid is selected from the group consisting of water, a monohydric alcohol, polyhydric alcohol, ether, aldehyde, ketone, carboxylic acid, hydrocarbon and an aqueous solution thereof.

17. The method of claim 11 wherein the liquid is a polyhydric alcohol having a molecular weight of at least 200.

18. The method of claim 11 wherein the liquid has a vapor pressure of lower than 2.3 kPa at 20° C.

19. A method of claim 11 wherein the liquid is coated by brush coating, spray coating, or spin coating.

* * * * *